United States Patent [19]

Eppich

[11] 4,297,735

[45] Oct. 27, 1981

[54] MANUALLY OPERABLE MAGNETIC CARD READER AND MAGNETIC HEAD ASSEMBLY THEREFOR

[75] Inventor: Helmut Eppich, West Vancouver, Canada

[73] Assignee: EBCO Industries, Ltd., Richmond, Canada

[21] Appl. No.: 60,776

[22] Filed: Jul. 26, 1979

[51] Int. Cl.³ .................. G11B 21/20; G11B 5/48
[52] U.S. Cl. ............................ 360/104; 360/130.3
[58] Field of Search ............... 360/2, 88, 104, 130.3; 235/482

[56] References Cited

U.S. PATENT DOCUMENTS

| | | | |
|---|---|---|---|
| 3,940,796 | 2/1976 | Haun et al. | 360/109 |
| 4,062,050 | 12/1977 | Shigemori et al. | 360/130.3 |
| 4,146,174 | 3/1979 | Darjany et al. | 360/2 |
| 4,151,564 | 4/1979 | Schreiber et al. | 360/109 |

Primary Examiner—Robert S. Tupper
Attorney, Agent, or Firm—Christensen, O'Connor, Johnson & Kindness

[57] ABSTRACT

A manually operable magnetic card reader including a housing 10 and a magnetic head assembly 40. The housing is provided with an elongate slot 23 adapted to receive a card C having a stripe MS of magnetized material extending along a major surface of the card. Intermediate the ends of the slot, the housing is cutaway to receive the magnetic head assembly which includes a block 42, 44 having defined therein a slot 80 which is in registry with the housing slot. Also defined in the block are first and second, opposing, aligned apertures 46, 64 which extend into the block from the block slot. A magnetic reading head 41 is reciprocally movable in the first aperture, and a pressure pad 43 is reciprocally movable in the second aperture. A pair of wire springs 45A, 45B are secured to the block and yieldably bias the magnetic reading head and pressure pad toward the block slot. To effect data reading, the card is inserted into the housing slot and moved therealong until the leading edge of the card passes into the block slot and passes between the opposed magnetic reading head and pressure pad. Upon further movement of the card, the forces exerted on the card major surfaces by the magnetic reading head and by the pressure pad cause the stripe of magnetized material to be maintained into close proximity to the magnetic reading head, and also insure that the card is moved past the magnetic reading head at a substantially constant velocity.

24 Claims, 7 Drawing Figures

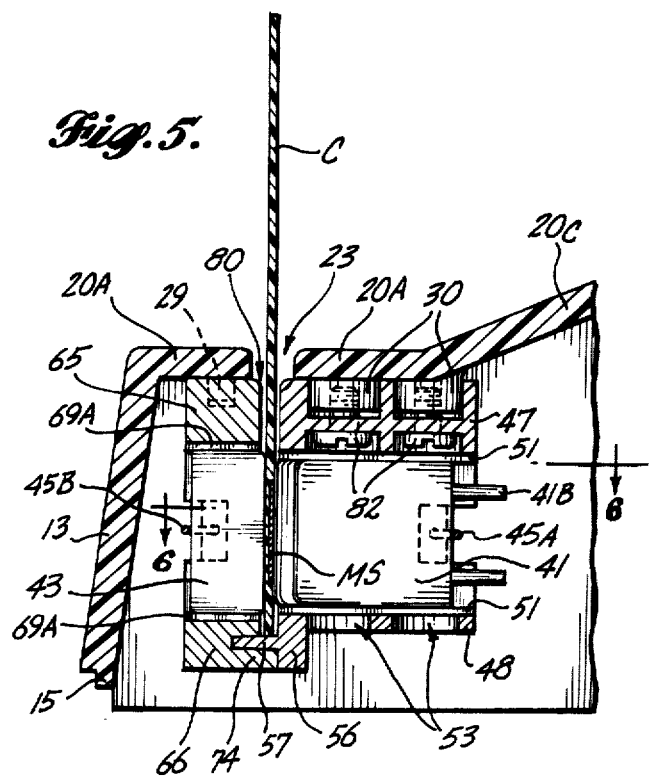
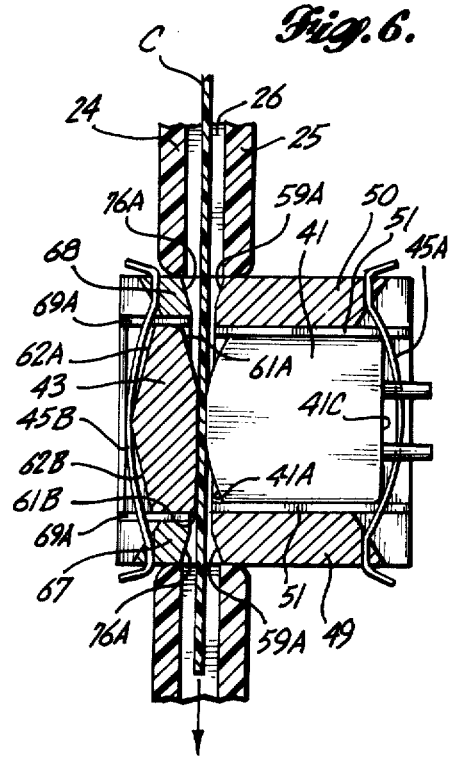
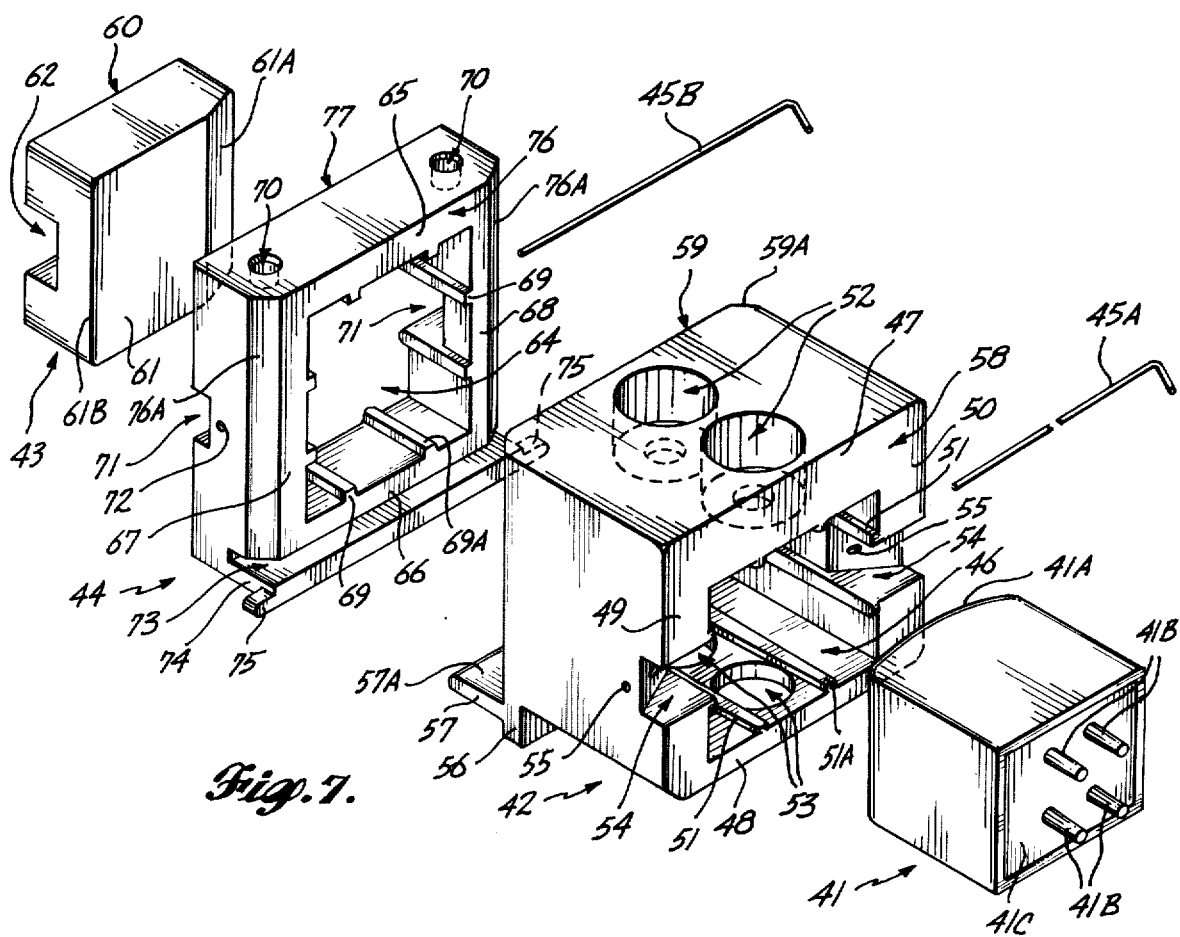

MANUALLY OPERABLE MAGNETIC CARD READER AND MAGNETIC HEAD ASSEMBLY THEREFOR

FIELD OF THE INVENTION

This invention generally relates to apparatus for reading data from a stripe of magnetized material extending along a card, and more particularly, to such an apparatus in which reading is effected by manual movement of the card through the apparatus.

BACKGROUND OF THE INVENTION

Extensive use has been and is being made of cards which bear data on a stripe of magnetized material. Such cards, for example, find application as credit cards and bank cards which permit the card user to facilitate credit and banking transactions, and identification badges which permit the card user to obtain access to a facility.

Typically, such cards include a plastic substrate, with the stripe of magnetized material being located on one of the major surfaces of the substrate. Data is read from the stripe by producing relative motion between the card and a magnetic reading head located in a magnetic card reader, with the magnetic reading head providing appropriate electrical signals representing the data to a signal processing apparatus forming part of a computer terminal or other apparatus.

Due to the fact that a card may be reused a considerable number of times, the card often becomes warped, or otherwise deformed in directions transverse to its major surfaces. To minimize errors in data reading that would otherwise occur, the stripe must be maintained in close proximity to the magnetic reading head for its entire length as the card is moved relative thereto. In addition, the card should be moved at a relatively uniform velocity with respect to the magnetic reading head.

The magnetic card readers of the prior art generally utilize some sort of mechanism for effecting relative motion between the card and the magnetic reading head and for exerting substantial pressure on the card during such motion to maintain the stripe in proximity to the magnetic reading head. For example, a common type of prior art magnetic reader includes sets of counterrotating, motor-driven rollers at the entrance to and at the exit from a card reading station including a magnetic reading head, with the rollers rotating at a substantial constant velocity and with the stripe being pressed against a surface of the magnetic reading head by a spring-biased member which bears against the major surface of the card opposite from that on which the stripe is located. As another example, magnetic readers are known to the prior art which utilize a single, resilient, motor-driven roller opposing the magnetic reading head, the roller being driven at a substantially constant velocity.

Although the prior art magnetic card readers generally provide acceptable operation in reading data from warped or otherwise deformed cards, they are subject to certain disadvantages. The mechanisms that are provided for card transport and for pressure application upon the card are generally complex in construction and operation and utilize many parts. Accordingly, such readers are expensive to construct and to maintain, and are additionally subject to failures when particularly used in hostile environments in which dust, dirt or grease is prevalent. The mechanisms are, for the most part, bulky so that the card readers cannot be utilized in many situations where space is at a premium. Further, the mechanisms require an external source of power for their operation and are therefore energy-inefficient.

It is therefore an object of this invention to provide an manually operable magnetic card reader which does not require an external source of power.

It is a further object of this invention to provide such a reader which is simple in its construction and operation, which utilizes a minimum number of parts, and which is compact, and which is therefore easy and inexpensive to construct, install and maintain.

It is yet a further object of this invention to provide such a reader which is rugged in its construction and which is accordingly not likely to fail when used in hostile environments.

It is another object of this invention to provide a magnetic head assembly for such a reader which is capable of providing reliable reading of data from a card bearing a stripe of magnetized material, irrespective of whether the card has been warped or otherwise deformed.

It is yet another object of this invention to provide a magnetic head assembly such a reader which permits the card to be manually moved relative to a magnetic reading head of the reader at a relatively uniform velocity.

SUMMARY OF THE INVENTION

These objects, and others that will be apparent to those of ordinary skill in the art, are achieved in a manually operable card reader for reading data contained in a stripe of magnetized material extending along one of the major surfaces of a card. The reader comprises a housing and a magnetic head assembly mounted in the housing. The housing has an elongated, housing slot which is defined by a pair of spaced-apart, opposing longitudinal walls and a floor joining the pair of longitudinal walls, with the housing slot being adapted to receive the card with its major surfaces parallel to the pair of longitudinal walls defining the housing slot. The magnetic head assembly includes a block having formed therein a block slot which is defined by spaced-apart, opposing faces and a floor face joining said pair of faces. When mounting in the housing, the block is positioned so that the block slot is in registry with the housing slot and so that the floor face of the block slot is substantially flush with the floor of the housing slot. The block also has formed therein first and second apertures transverse to and intersecting the block slot, the first and second apertures opposing each other across the block slot. A magnetic reading head is reciprocally movable in the first aperture, and a pressure pad is reciprocally movable in the second aperture. Means are provided to yieldably bias the magnetic reading head and the pressure pad toward the block slot.

BRIEF DESCRIPTION OF THE DRAWINGS

The invention can best be understood by reference to the following portion of the specification, taken in conjunction with the accompanying drawings in which:

FIG. 5 is a cross-sectional view taken along the line 5—5 in FIG. 1;

FIG. 6 is a cross-sectional view taken along the line 6—6 in FIG. 5; and,

FIG. 7 is an exploded view of the magnetic head assembly.

DESCRIPTION OF THE PREFERRED EMBODIMENT

Figure 1:
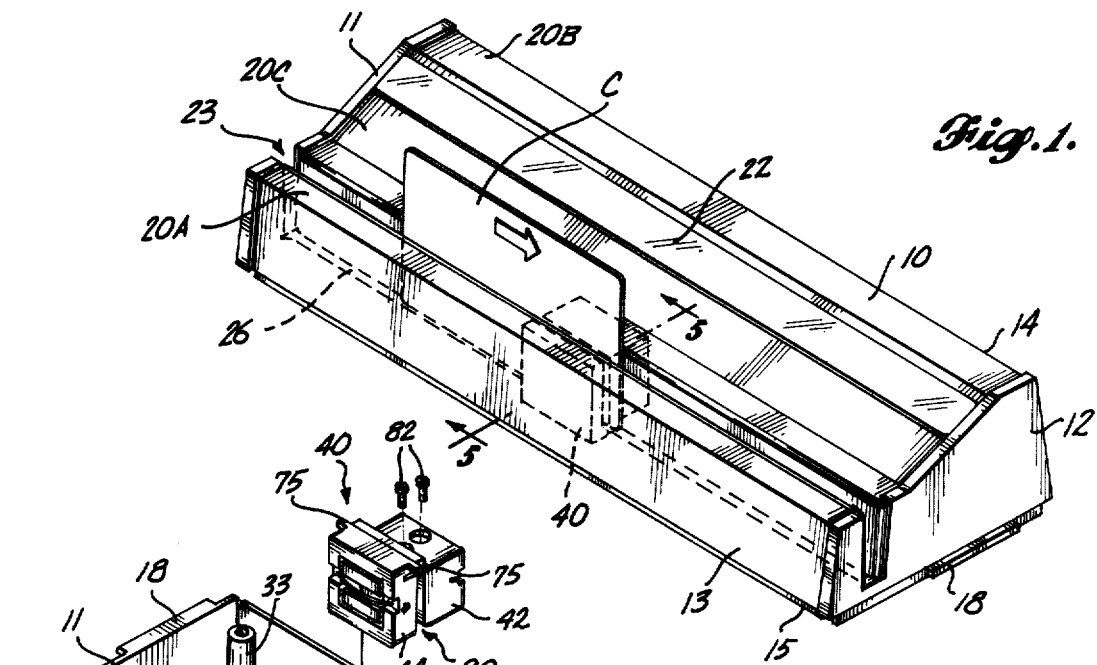
FIG. 1 is a pictorial view of the manually operable magnetic card reader.
Figure 2:
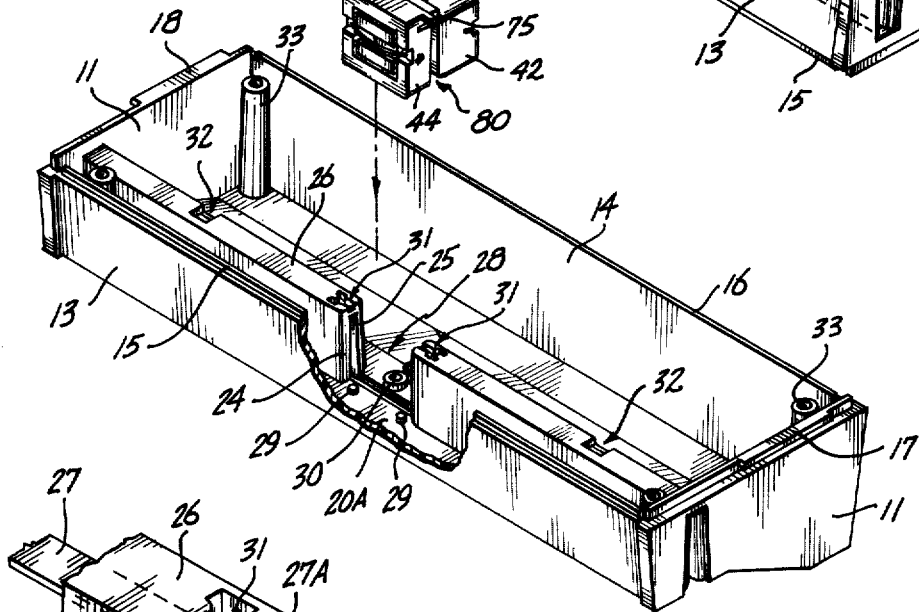
FIG. 2 is another pictorial view of the reader, as seen from the underside and particularly illustrating the installation of a magnetic head assembly in a housing of the reader.

Referring now to FIGS. 1 and 2, the manually operable magnetic card reader includes a housing 10 which is molded from a thermoplastic material and which has two oppositely disposed end walls 11, 12, and two oppositely disposed longitudinal side walls 13, 14. In the form depicted, housing 10 is particularly adapted for installation with a base unit of a modular housing illustrated and described in U.S. Pat. No. 4,084,214, Eppich, "Modular Housing For Electronic Apparatus", Apr. 11, 1978, which is assigned to the assignee of the present invention and which is expressly incorporated by reference herein. In particular, housing 10 is configured in a manner similar to a cover unit more particularly described in that patent with reference to FIGS. 14 and 15 thereof, and is adpated to be installed in a recess in a base unit more particularly described in that patent with reference to FIGS. 2 and 3 thereof. To retain the housing 10 in the base unit, longitudinal side walls 13, 14 are provided with respective ridges 15, 16, each of which extends downwardly from the lower edge surface of its corresponding longitudinal side wall and each of which is dimensioned to be received within a slot formed between posts and longitudinal walls defining the base unit recess. Likewise, a slot is formed adjacent each end wall 11, 12 of the housing 10 by respective flanges 17, 18, each of which projects orthogonally outward from its associated end wall to form a slot substantially parallel to the lower edge of each end wall. Upon installation of the housing 10 to the base unit, the slots formed by flanges 17, 18 receive corresponding tabular projections on the end walls of the base unit recess. For further details of the manner in which the housing 10 is installed in the base unit, reference should be made to the aforementioned U.S. Pat. No. 4,084,214.

Housing 10 also has a top wall divided into a lower elevation portion 20A adjacent to longitudinal side wall 13, a higher elevation portion 20B adjacent to longitudinal side wall 14, and an inclined portion 20C intermediate and connected to portions 20A, 20B. A transparent lens 22 is located in and extends along the length of inclined portion 20C for permitting the display of alphanumeric information by a display means (not illustrated) which is located within the housing 10, and which forms no part of the present invention.

An elongated slot 23, for receiving a card C having a stripe MS of magnetized material, extends along housing 10 between end walls 11, 12 and is defined by front and rear, spaced-apart walls 24, 25 which depend downwardly from the lower surface of portion 20A of the housing top wall and by a floor 26 which bridges the lower ends of walls 24, 25.

At points approximately midway between end walls 11, 12, the front wall 24, the rear wall 25 and the floor 26 defining the slot 23 are cut away to define an opening 28 for receiving a magnetic head assembly 40. As described in detail hereinafter, magnetic head assembly 40 has defined therein a slot 80 which, in assembly, is aligned with the portions of slot 23 on either side of the opening 28. To facilitate such alignment, a pair of projections 29 extend from the lower surface of the portion 20A between front wall 24 and longitudinal side wall 13, and a pair of projections 30 extend from the lower surface of portion 20A between rear wall 25 and longitudinal side wall 14, with projections 29, 30 being received in corresponding apertures in the magnetic head assembly 40 and with a pair of fasteners 82 being passed through magnetic head assembly 40 and being received in threaded inserts in projections 30 to secure magnetic head assembly 42 to housing 10, as described in detail hereinafter.

Figure 3:
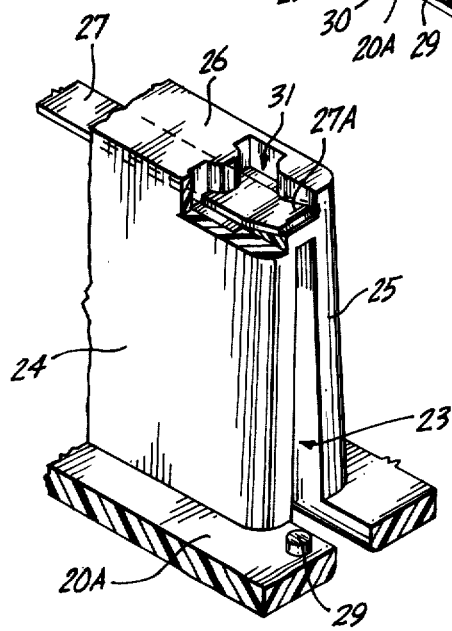
FIG. 3 is an enlarged portion of the pictorial view of FIG. 2.
Figure 4:
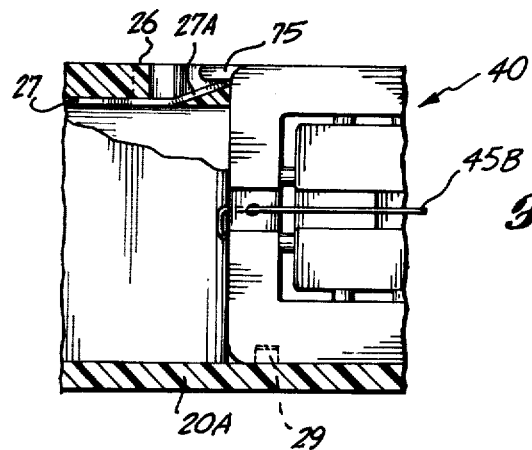
FIG. 4 is an elevational view of a portion of the magnetic head assembly as installed in the reader housing.

With additional reference now to FIGS. 3 and 4, a metallic insert 27 is molded in and extends along the length of the floor 26 from opening 28 to end wall 11 and to end wall 12. As best seen in FIG. 4, metallic insert 27 is exposed through the top of floor 26 and thus to slot 23, and therefore provides a surface on which a lower edge surface of the card C may slide as the card is moved through slot 23. An inclined portion 27A of metallic insert 27 is also exposed through the bottom of the floor 26 by a recess 31 adjacent each side of the opening 28, with recesses 31 receiving corresponding tabs 75 of the magnetic head assembly 40. In addition, recesses 32 are provided in the bottom of floor 26 at points intermediate opening 28 and end walls 11, 12 so as to expose corresponding portions of the metallic insert 27. As described hereinafter, magnetic head assembly 40 is composed of a metallic material, so that the connection of the portions of metallic insert 27 exposed through recesses 32 and magnetic head assembly 40 to a common point by appropriate leads, not illustrated, allows the establishment of a common reference potential throughout metallic insert 27 and magnetic head assembly 40 so as to minimize data reading errors.

In use, the card C is inserted into slot 23 adjacent end wall 11, with the major surface thereof bearing stripe MS facing rear wall 25, until a lower edge surface of the card contacts the floor 26 including metallic insert 27. Card C is then moved through slot 23 toward end wall 12 until its leading edge passes into slot 80 in the magnetic head assembly 40. As the card C is thereafter moved through the magnetic head assembly 40, means are provided within the magnetic head assembly 40 for maintaining the stripe MS in close proximity to a magnetic reading head therein, and for regulating the speed at which the card can be moved relative to the magnetic reading head. As the leading edge of the card exits from slot 80, it reenters the continuation of slot 23 so that the card may continue to be moved until the entire card has exited from the the magnetic head assembly 40, at which point the card may be withdrawn.

The housing 10 is completed by a plurality of internal corner posts 33 (FIG. 2) located at each juncture in the housing of an end wall and a side wall. A printed circuit board (not illustrated) which contains various electrical components of the reader and other apparatus accordingly may be supported within housing 10 on corner posts 33 and secured thereto by appropriate fasteners.

With additional reference now to FIGS. 5, 6 and 7, the magnetic head assembly 40 includes a magnetic reading head 41, a head mounting block 42, a pressure pad 43, a pressure pad mounting block 44, and a pair of wire springs 45A, 45B. The magnetic reading head 41 is of a conventional type and includes a substantially cubical housing having an arcuate reading surface 41A, in which are located one or more pole pieces for the magnetic head, and a plurality of electrical terminals 41A upon which appear electrical signals that correspond to the data that has been read. The head mounting block 42 and the pressure pad mounting block 44, which are each preferably fabricated from a nonmagnetic, metallic material (such as brass), have defined therein respective apertures 46, 64 for receiving magnetic reading head 41 and pressure pad 43 (which is also preferably fabricated from a nonmagnetic, metallic material such as brass). In assembly, head mounting block 42 and pressure pad mounting block 44 are joined to each other so as to define therebetween slot 80, with magnetic reading head 41 and pressure pad 43 opposing each other across slot 80 while being received in apertures 46, 64, and being yieldably biased towards each other by wire springs 45A, 45B.

Specifically, head mounting block 42 includes a top wall 47, a bottom wall 48, and side walls 49, 50, all of which have a common rear face 58 and a common front face 59. Aperture 46 is defined by orthogonal, interior wall surfaces of the walls 47, 48, 49 and 50, with each wall surface having located thereon a plurality of ridges 51 each extending between the rear face 58 and the front face 59. Each ridge 51 is provided with a substantially planar top surface 51A. As best seen in FIGS. 5 and 6, ridges 51 are complementary to the housing of the magnetic reading head 41 so that magnetic reading head 41, when inserted into aperture 46, can engage in reciprocal motion by riding on surfaces 51A. It is not essential in the practice of the invention that ridges 51 be utilized. Rather, the aperture 46 could be defined by substantially planar, orthogonal surfaces which were generally complementary to the housing of the magnetic reading head 41. However, by using ridges 51, only the surfaces 51A thereof have to be precisely formed (e.g., by machining) and the remaining wall surfaces defining the aperture 46 can be roughly formed (e.g., by casting), thus leading to ease of manufacture. In addition, the gaps present between the housing of the magnetic reading head 41 and the remaining wall surfaces defining the aperture 46 permit a significant amount of dust and dirt to accumulate without impeding the free reciprocal motion of magnetic reading head 41 in head mounting block 42.

A pair of apertures 52 are formed on top wall 47 and extend therethrough into communication with the aperture 46. As best seen in FIGS. 5 and 7, each aperture 52 is countersunk on each side thereof. A pair of apertures 53 are formed in bottom wall 48 in opposing and aligned relationship with apertures 52. As best seen in FIG. 5, the magnetic head assembly 40 is secured to housing 10 by inserting the projections 30 of housing 10 into the countersunk portions of apertures 52, and by inserting a pair of threaded machine screws 82 through apertures 53 and apertures 52 into threaded engagement with the metallic inserts within projections 30 while the magnetic reading head 41 is removed from the magnetic head assembly 40, with the heads of machine screws 82 being totally contained within the opposing countersunk portions of apertures 52 when the machine screws 82 have been fully tightened down.

An angled notch 54 extends into each of the side walls 49, 50 from the rear face 58 and a small aperture 55 extends through each side wall 49, 50 and exits in each notch 54. Upon insertion of magnetic reading head 41 in aperture 46, the head is moved until its rear surface 41C is forward of apertures 55. The wire spring 45A is then inserted through one aperture 55, across the aperture 46, and through the other aperture 55, with the ends of the wire spring 45A being bent or deformed to retain the wire spring in place. As best seen in FIG. 6, wire spring 45A when installed engages rear surface 41C of magnetic reading head 41, whereupon magnetic reading head 41 is yieldably biased toward front face 59. The depth of aperture 46 is such that a significant portion of the arcuate reading surface 41A projects beyond the front face 59 while the rear surface 41C is in engagement with wire spring 45A.

The pressure pad 43 comprises a block having a rear surface 60 and a front surface 61, and is received within aperture 64 of pressure pad mounting block 44 as previously described. Pressure pad mounting block 44 includes top wall 65, bottom wall 66, and side walls 67, 68, all of which have a common rear face 77 and a common front face 76. Aperture 64 is defined by orthogonal, interior wall surfaces of walls 65, 66, 67 and 68, with each wall surface having located thereon a plurality of ridges 69 each extending between the rear face 77 and the front face 76. Each ridge 69 is provided with a substantially planar top surface 69. As best seen in FIGS. 5 and 6, ridges 69A are complementary to the pressure pad 43 so that pressure pad 43, when inserted into aperture 64, rides on surfaces 69A.

An angled notch 71 extends into each of the side walls 67, 68 from the rear face 77, and a small aperture 72 extends through each side wall 67, 68 and exits in each notch 71. When pressure pad 43 is received in aperture 64 and is moved until its rear surface 60 is forward of notches 71, wire spring 45B is inserted through one of the apertures 72, across the aperture 64, and through the other aperture 72. As best seen in FIG. 6, the rear surfac 60 of pressure pad 43 is provided with a notch 62 which has defined therein a pair of oppositely inclined, intersecting surfaces 62A, 62B. When installed, wire spring 45 contacts the line of intersection of oppositely inclined surfaces 62A, 62B to accordingly yieldably bias pressure pad 43 toward the front face 76. The depth of aperture 64 is such that the front surface 61 of pressure pad 43 projects beyond the front face 76 while the line of intersection of surfaces 62A, 62B is in engagement with wire spring 45B.

To assist in registration of magnetic head assembly 40 when mounted in housing 10, pressure pad mounting block 44 includes a pair of apertures 70 in top wall 65 which are located so as to receive the projections 29 on wall portion 20A, and also include the pair of tabs 75 extending from opposite ends of flange 74 and located so as to be received in recesses 31 in floor 26 (FIG. 2).

In order to facilitate the assembly of head mounting block 42 to pressure pad mounting block 44 so as to define the slot 80 (FIG. 2), head mounting block 42 includes a ridge 56 which extends orthogonally from the bottom wall 48 thereof adjacent front face 59, and a tongue 57 extending orthogonally from ridge 56. Likewise, pressure pad mounting block 44 includes a groove 73 which is defined by a flange 74 extending from and spaced apart from bottom wall 66 and adjacent front face 76. Tongue 57 is inserted into groove 73 until flange 74 abuts ridge 56, with the assembly being secured by the use of a suitable adhesive, by soldering, or by any other conventional fastening method. When head mounting block 42 and pressure pad mounting block 44 are thus assembled, the front faces 59, 76 thereof are in opposing, parallel, spaced relationship to accordingly define the wall surfaces of the slot 80, with the floor surface of the slot 80 being defined by a portion 57A of tongue 57 adjacent front face 59. Also, the respective wire springs 45A, 45B yieldably bias the arcuate reading surface 41A of magnetic reading head 41 and the front surface 61 of pressure pad 43 into contact with each other within the slot 80.

In constructing the magnetic card reader, head mounting block 42 and pressure pad mounting block 44 are assembled and pressure pad 43 and wire spring 45B are installed in pressure pad mounting block 44. From FIGS. 3 and 4, it will be noted that aperture 64 in pressure pad mounting block 44 is larger than aperture 46 in head mounting block 42. Accordingly, pressure pad 43 is retained within aperture 64 by wire spring 45B and by the front face 59 of head mounting block 42. Magnetic head assembly 40 is then inserted into opening 28 in housing 10, with projections 30 being received in the countersunk portions of apertures 52, projections 29 being received in apertures 70, and tabs 75 being received in recesses 31 and contacting metallic insert 27. Machine screws 82 are inserted through apertures 53, through apertures 52, and threaded into the inserts in projections 30 until tight. Magnetic reading head 41 and wire spring 45A are then installed in head mounting block 42. One or more ground leads, not illustrated, are connected to the portions of metallic insert 27 exposed through recesses 32 and to head mounting block 42, and various signal leads, also not illustrated, are connected to electrical terminals 41B of magnetic reading head 41.

When the rear construction is completed, the floor of slot 80 defined by portion 57A of tongue 57 is flush with the floor 26 of slot 23. Further, portions of head mounting block 42 and pressure pad mounting block 44 respectively adjacent front faces 59, 76 thereof project into slot 23 beyond the respective walls 25, 24 thereof (FIGS. 5 and 6).

In operation of the magnetic card reader, the card C is inserted into slot 23 adjacent end wall 11 with its major surfaces parallel to walls 24, 25 and with stripe MS facing wall 25. When the lower edge surface of card C contacts the floor 26 of slot 23 including metallic insert 27, card C is slid therealong until the leading edge of the card approaches the magnetic head assembly 40. As best illustrated in FIGS. 6 and 7, the vertical edges 59A, 76A of the front faces 59, 76 of head mounting block 42 and pressure pad mounting block 44 are chamfered so as to provide a smooth, sloping transition from walls 25, 24 to faces 59, 76. Accordingly, as card C is further moved along slot 23 from end wall 11 to end wall 12, the leading edge of the card is smoothly guided into slot 80 and the lower edge of the card passes on to the floor of slot 80 defined by portion 57A of tongue 57. As also best illustrated in FIGS. 6 and 7, the vertical edge 61A of front surface 61 of pressure pad 43 adjacent end wall 11 in assembly is also chamfered so as to smoothly direct the leading edge of the card between pressure pad 43 and magnetic reading head 41. As card C is moved further along the slot 23, the opposing forces exerted on pressure pad 43 and magnetic reading head 41 by wire springs 45A, 45B cause the stripe MS to be maintained against the arcuate reading surface 41A of magnetic reading head 41, irrespective of warping or deformation of card C in directions transverse to its major surfaces. For example, if card C should exhibit a bend to its right as viewed in plan in FIG. 6, both pressure pad 43 and magnetic reading head 41 will move to the right as card C is moved along the slot 23. Likewise, a leftward warp in card C will cause both pressure pad 43 and magnetic reading head 41 to move to the left. In addition to maintaining the stripe MS in proximity to the magnetic reading head 41, the thus-described reciprocal motions of pressure pad 43 and magnetic reading head 41 also cause rather predictable frictional forces to be exerted on the opposing major surfaces of card C so as to assit the user in moving the card through the magnetic head assembly 40 at a relatively uniform velocity.

As the stripe MS passes the magnetic reading head 41, electrical signals representing the data contained within the stripe MS are generated by magnetic reading head 41 in a conventional manner and appear on terminals 41B. As the trailing edge of card C passes out of the slot 80, the data reading process is complete and card C may be retrieved by simply lifting it out of the continuation of slot 23.

To prevent data reading errors that would occur if card C were to be moved through the slot 80 in a direction from the end wall 12 to the end wall 11, the edge 61B of front surface 61 on pressure pad 43 which faces end wall 12 is relatively sharp. Therefore, when a card is inserted into slot 23 adjacent end wall 12 and moved toward end wall 11, the leading edge of the card abuts the side of pressure pad 43 so that the card cannot proceed into the slot 80.

It will therefore be apparent to those of ordinary skill in the art that the magnetic card reader of the present invention is manually operable and requires no external source of power for its successful operation. The reader also is extremely rugged and simple in its construction, is relatively insensitive to environmental conditions, and requires a minimum number of parts for its successful implementation (in the illustrated embodiment, a total of nine parts excluding the electrical leads and related circuitry). Although more difficult to manufacture, the magnetic head assembly 40 can be further simplified by forming head mounting block 42 and pressure pad mounting block 44 from a single block of material in which there is cut a card slot and a single, transverse aperture for receiving the pressure pad and opposing magnetic reading head. If maintenance, repair or replacement of the magnetic reading head 41 is required, the head may be withdrawn from the magnetic head assembly 40 after removal of wire spring 45A. Likewise, the magnetic head assembly 40 may be removed from housing 10 after withdrawal of magnetic reading head 41 and removal of machine screws 82. To reverse the direction of card reading, all that is required is to reverse the position of pressure pad 43 within pressure pad mounting block 44 after removal of the magnetic head assembly 40 and removal of wire spring 45B. Finally, due to the opposing, reciprocal motions of the yieldably-biased pressure pad and magnetic head, the magnetic head assembly is capable of providing reliable reading of data from a stripe of magnetized material extending along a major surface of a card, irrespective of whether the card is warped or otherwise deformed in directions transverse to that major surface, and is further capable of ensuring that the card and the strip are moved pas the magnetic head at a relatively uniform velocity.

While the invention has been described with reference to a preferred embodiment, it is to be clearly understood that the scope of the invention is not limited thereto, but rather is to be interpreted only in conjunction with the appended claims.

The embodiments of the invention in which an exclusive property or privilege is claimed are defined as follows:

1. For use in a magnetic card reader which includes a housing defining a housing slot through which a card is manually moved, by grasping the card and sliding the card along the housing slot, to effect reading of data magnetically recorded on the card, a magnetic head assembly separate from the housing and comprising:
    block means having formed therein a block slot through which the card passes as the card is manually moved through the housing slot, and also having formed therein first and second apertures extending into said block means from said block slot and opposing each other across said block slot;
    a magnetic reading head in said first aperture and a pressure pad in said second aperture, and separate means respectively mounting said magnetic reading head and said pressure pad in there respective apertures for reciprocal motion therein to and from said block slot; and
    means yieldably biasing said magnetic reading head and said pressure pad toward said block slot.

2. A magnetic head assembly as recited in claim 1, wherein said block means include first and second block portions each having a front face and a rear face, said front faces being in spaced-apart, opposing relationship to define said block slot, and wherein said first and second apertures extend from said front face to said rear face of said first and said second block portions, respectively.

3. A magnetic head assembly as recited in claim 2, wherein said biasing means includes first spring means and second spring means respectively secured to said first and said second block portions adjacent said rear faces thereof and respectively bearing on said magnetic reading head and said pressure pad.

4. A magnetic head assembly as recited in claim 3, wherein said first and said second spring means comprises first and second wire springs respectively extending across said first and said second apertures adjacent said rear face of said first and said second block portions.

5. A magnetic head assembly as recited in claim 4, further comprising means for removably securing said first and said second wire springs to said first and said second block portions.

6. A magnetic head assembly as recited in claim 5, wherein said removably securing means comprises a pair of apertures formed in each of said first and second block portions, the apertures in each said pair opposing each other across said first and said second apertures, each said pair of apertures receiving a respective one of said first and second wire springs.

7. A magnetic head assembly as recited in claim 5, wherein said pressure pad and said second aperture have a larger cross-sectional area than said magnetic reading head and said first aperture, so as to retain said pressure pad in said magnetic head assembly upon withdrawal of said magnetic reading head therefrom.

8. A magnetic head assembly as recited in claim 2, wherein said first and said second block portions are formed as first and second, separate blocks, and wherein one of said first and said second blocks includes a tongue projecting orthogonally from the front face thereof, and the other of said first and said second blocks includes a groove formed in its front face for receiving said tongue, a portion of said tongue defining a floor of said block slot upon assembly of said first and said second blocks.

9. A magnetic head assembly as recited in claim 2, wherein said first and said second apertures are each defined by a plurality of orthogonally-intersecting surfaces of their associated block portion, and by a plurality of substantially parallel ridges located on each said surface and extending between said front face and said rear face of the associated block portion.

10. A magnetic head assembly as recited in claim 1, wherein said block means consists of a nonmagnetic, metallic material.

11. A magnetic head assembly as recited in claim 1, wherein said magnetic reading head and said pressure pad are urged into contact with each other by said biasing means.

12. A magnetic head assembly as recited in claim 1, wherein a portion of at least one of said magnetic reading head and said pressure pad is projected into said block slot by said biasing means.

13. A magnetic card reader for reading data contained in a stripe of magnetized material extending along one of the major surfaces of a card, said reader comprising:
    a housing having an elongated, housing slot which is defined by a pair of spaced-apart, opposing longitudinal walls and a floor joining said pair of longitudinal walls, said housing slot being adapted to receive said card with said major surfaces parallel to said pair of longitudinal walls so that said card can be manually moved through said housing slot by grasping the card and sliding the card along said housing slot; and,
    a magnetic head assembly mounted in and separate from said housing for reading data from said card as said card is manually moved through said housing slot, said magnetic head assembly including:
        a block having formed therein a block slot which is defined by a pair of spaced-apart, opposing faces and a floor face joining said pair of faces, said block slot being in registry with said housing slot and said floor face of said block slot being substantially flush with said floor of said housing slot so as to permit said card to pass through said block slot as said card is manually moved through said housing slot, said block also having formed therein first and second apertures transverse to and intersecting said block slot, said first and second apertures opposing each other across said block slot;
        a magnetic reading head in said first aperture and a pressure pad in said second aperture, and separate means respectively mounting said magnetic reading head and said pressure pad in their respective apertures for reciprocal motion therein to and from said block slot; and,
        means yieldably biasing said magnetic reading head and said pressure pad toward said block slot.

14. A reader as recited in claim 13, further comprising a plurality of projections located on one of said housing and said magnetic head assembly and a plurality of corresponding recesses located on the other of said housing and said magnetic head assembly, said plurality of corresponding recesses receiving said plurality of projections for positioning said magnetic head assembly in said housing so that said block slot is in registry with said housing slot.

15. A reader as recited in claim 13, wherein the separation between said pair of opposing faces of said block across said block slot is less than the separation between said pair of longitudinal walls of said housing across said housing slot, and wherein the edges of said block are chamfered to provide a smooth transition from said pair of longitudinal walls of said housing slot to said pair of faces of said block slot.

16. A reader as recited in claim 13, wherein said housing slot is divided into first and second portions extending from either side of said block slot.

17. A reader as recited in claim 16, wherein said magnetic head assembly includes means for permitting said card to be moved only from said first portion of said housing slot into said block slot.

18. A reader as recited in claim 17, wherein said biasing means projects a front face of said pressure pad into said block slot, and wherein said permitting means is provided by a chamfered edge on said front face adjacent said first portion of said housing slot and by a relatively sharp edge on said front face adjacent said second portion of said housing slot.

19. A reader as recited in claim 16, wherein said pair of longitudinal walls and said floor defining said housing slot are cut-away intermediate the ends of said housing slot to define an opening for receiving said magnetic head assembly.

20. A reader as recited in claim 13, wherein said housing consists of an electrically-insulating material.

21. A reader as recited in claim 20, wherein said housing is molded from a thermoplastic material.

22. A reader as recited in claim 13, wherein said block consists of a nonmagnetic, metallic material.

23. A reader as recited in claim 13, wherein: said housing is molded from a thermoplastic material; said block consists of a nonmagnetic, metallic material; said floor of said housing slot has molded therein a metallic insert extending along the length of said housing slot, a portion of said metallic insert being exposed to said housing slot for contacting said card; and, further comprising means for electrically interconnecting said metallic insert and said block.

24. A reader as recited in claim 23, wherein said pair of longitudinal walls and said floor defining said housing slot are cut-away intermediate the ends of said housing slot to define an opening for receiving said magnetic head assembly; wherein the portions of said floor adjacent said opening are provided with recesses exposing said metallic insert; and, wherein said block is provided with a pair of oppositely-extending tabs which are received in said recesses and which contact said metallic insert.

* * * * *